US010495231B2

(12) United States Patent
Rankin et al.

(10) Patent No.: US 10,495,231 B2
(45) Date of Patent: Dec. 3, 2019

(54) FURNACE BRAZE DEPOSITION OF HARDFACE COATING ON WEAR SURFACE

(71) Applicant: Hamilton Sundstrand Corporation, Windsor Locks, CT (US)

(72) Inventors: Kevin M. Rankin, Windsor, CT (US); Blair A. Smith, South Windsor, CT (US); Timothy R. Boysen, Simsbury, CT (US); Aaron T. Nardi, East Granby, CT (US); Keith J. Brooky, Wallingford, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 328 days.

(21) Appl. No.: 15/185,188

(22) Filed: Jun. 17, 2016

(65) Prior Publication Data

US 2016/0298780 A1 Oct. 13, 2016

Related U.S. Application Data

(62) Division of application No. 12/940,558, filed on Nov. 5, 2010, now Pat. No. 9,976,664.

(51) Int. Cl.
*F16K 25/00* (2006.01)
*C23C 4/18* (2006.01)
(Continued)

(52) U.S. Cl.
CPC ............ *F16K 25/005* (2013.01); *B64D 13/00* (2013.01); *C23C 4/18* (2013.01); *C23C 24/106* (2013.01); *F16K 1/22* (2013.01)

(58) Field of Classification Search
CPC ........... F16K 1/22; F16K 25/005; F16K 1/224
(Continued)

(56) References Cited

U.S. PATENT DOCUMENTS 2,361,962 A   11/1944 Ronay
2,672,806 A   3/1954 Vehige
(Continued)

FOREIGN PATENT DOCUMENTS

CN    2391064 Y    8/2000
WO    98/08639 A1  3/1998

OTHER PUBLICATIONS

Zisman, W.A., Relation of the Equilibrium Contact Angle to Liquid and Solid Constitution, U.S. Naval Research Laboratory, Jan. 1, 1964, pp. 1-51.

(Continued)

*Primary Examiner* — Steven B McAllister
*Assistant Examiner* — Ko-Wei Lin
(74) *Attorney, Agent, or Firm* — Carlson, Gaskey & Olds, P.C.

(57) ABSTRACT

A disclosed method of hard coating a wear surface of a valve of an aircraft air management system is performed by depositing a hardface alloy powder onto the wear surface, heating the wear surface and the hardface alloy powder to transform the hardface alloy powder into a molten liquid mass, and subsequently cooling the molten liquid hardface alloy mass to solidify the hardface alloy onto the wear surface. The disclosed process provides for localized application and subsequent bonding of the hardface alloy to discrete portions of the wear surface. The solidified hardface alloy coating may then be machined to obtain specific wear surface geometries.

11 Claims, 4 Drawing Sheets

(51) Int. Cl.
*C23C 24/10* (2006.01)
*B64D 13/00* (2006.01)
*F16K 1/22* (2006.01)

(58) Field of Classification Search
USPC .................................. 251/305–306, 359, 368
See application file for complete search history.

(56) References Cited

U.S. PATENT DOCUMENTS

| | | | |
|---|---|---|---|
| 2,934,312 A | | 4/1960 | Stevens |
| 3,143,132 A | * | 8/1964 | Pangburn ............... F16K 1/2268 137/375 |
| 3,570,142 A | * | 3/1971 | Koral ..................... G09B 23/24 434/283 |
| 3,642,519 A | | 2/1972 | Tiner et al. |
| 4,024,617 A | | 5/1977 | McCormick |
| 4,139,660 A | * | 2/1979 | Tur ........................ D06M 11/20 427/353 |
| 4,237,362 A | | 12/1980 | Arnoldy |
| 4,529,169 A | | 7/1985 | Johns et al. |
| 4,615,903 A | | 10/1986 | Miller |
| 4,837,417 A | | 6/1989 | Funk |
| 4,942,059 A | | 7/1990 | Wilson |
| 5,051,112 A | | 9/1991 | Keshavan et al. |
| 5,271,965 A | | 12/1993 | Browning |
| 5,375,759 A | | 12/1994 | Hiraishi et al. |
| 5,716,143 A | | 2/1998 | Browne et al. |
| 5,749,218 A | | 5/1998 | Cromer et al. |
| 5,879,743 A | | 3/1999 | Revankar |
| 6,034,344 A | | 3/2000 | Ittleson et al. |
| 6,048,171 A | | 4/2000 | Donnelly et al. |
| 6,082,291 A | | 7/2000 | Ittleson et al. |
| 6,090,497 A | | 7/2000 | Mori et al. |
| 6,156,391 A | | 12/2000 | Shum et al. |
| 6,186,508 B1 | | 2/2001 | Zajchowski et al. |
| 6,888,088 B2 | | 5/2005 | Bolton et al. |
| 6,910,614 B2 | | 6/2005 | Mitten et al. |
| 7,361,411 B2 | | 4/2008 | Daemen et al. |
| 7,422,769 B2 | | 9/2008 | Kassner et al. |
| 7,479,299 B2 | | 1/2009 | Raybould et al. |
| 7,535,150 B1 | | 5/2009 | Wilson |
| 7,780,059 B2 | | 8/2010 | Clark |
| 2004/0157066 A1 | | 8/2004 | Arzoumanidis |
| 2005/0064095 A1 | | 3/2005 | Revankar |
| 2005/0189513 A1 | | 9/2005 | Ino et al. |
| 2006/0237680 A1 | * | 10/2006 | Denike .................. B64D 13/02 251/305 |
| 2006/0272909 A1 | | 12/2006 | Fuller et al. |
| 2007/0141375 A1 | | 6/2007 | Budinger et al. |
| 2007/0154338 A1 | | 7/2007 | Sathian et al. |
| 2008/0304975 A1 | | 12/2008 | Clark et al. |
| 2009/0041611 A1 | | 2/2009 | Sathian et al. |
| 2009/0191429 A1 | | 7/2009 | Maeda et al. |
| 2009/0277818 A1 | | 11/2009 | Stachura et al. |
| 2010/0206527 A1 | | 8/2010 | Hu et al. |
| 2010/0221567 A1 | | 9/2010 | Budinger et al. |
| 2010/0279147 A1 | | 11/2010 | Kusinski et al. |
| 2011/0121056 A1 | | 5/2011 | Cheney et al. |
| 2011/0260086 A1 | * | 10/2011 | Arnold .................. F16K 1/2268 251/308 |
| 2012/0224992 A1 | | 9/2012 | Cheney et al. |

OTHER PUBLICATIONS

Extended European Search Report for Application No. EP11187001.0 dated Jan. 23, 2012.
European Exam Report for European Application No. 11187001.0-1353 completed on Aug. 15, 2013.
Extended European Search Report for EP Application No. 14198391.6 dated Jul. 10, 2015.

* cited by examiner

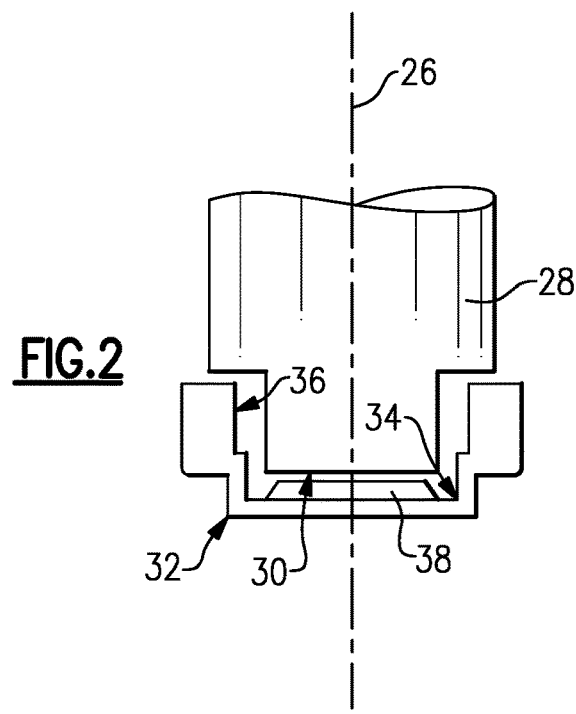
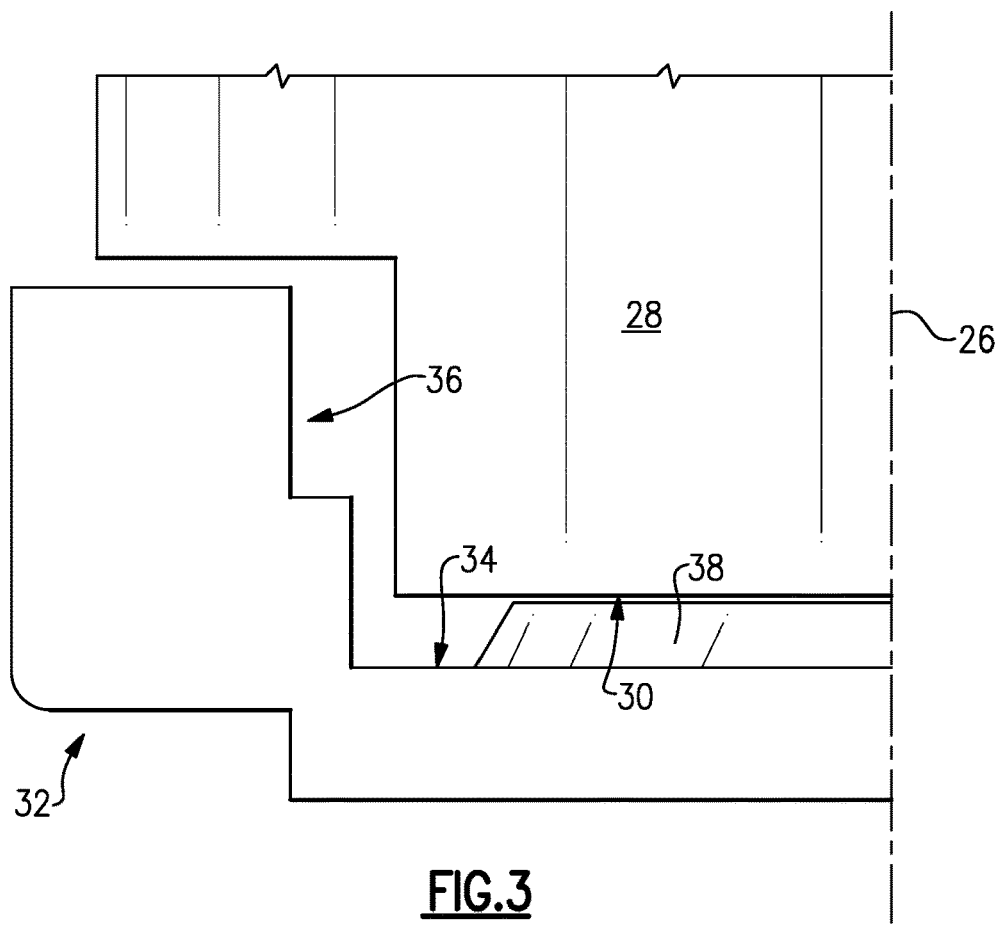

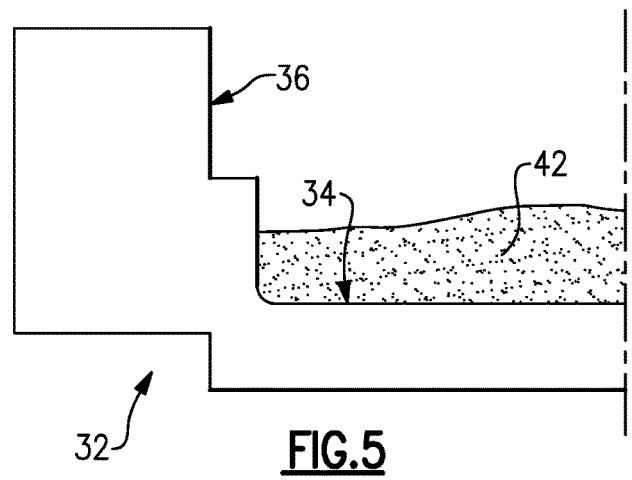
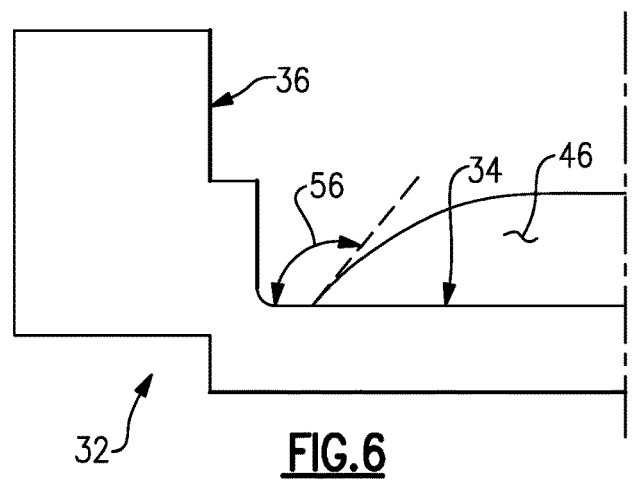
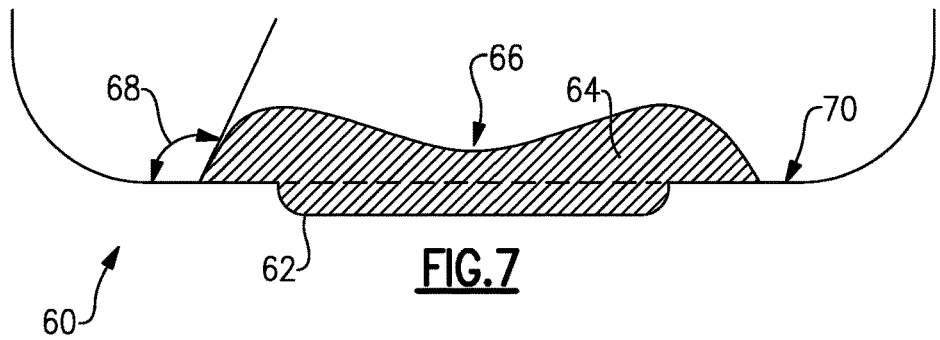

FURNACE BRAZE DEPOSITION OF HARDFACE COATING ON WEAR SURFACE

REFERENCE TO RELATED APPLICATION

This application is a divisional of U.S. application Ser. No. 12/940,558 filed on Nov. 5, 2010.

BACKGROUND

This disclosure generally relates to formation of wear surfaces supporting sliding or rotational movement. More particularly, this disclosure relates to a method of producing a hardface wear surface including desired material properties.

A wear resistant coating is applied to protect sliding components and extend operational life. Wear resistant coatings may utilize a hardfacing alloy that is applied to contact surfaces of a sliding or rotating component. Application of a hardface alloy is conventionally performed utilizing puddle-weld or arc-spray methods. The puddle-weld method is performed manually and cannot provide consistently repeatable results. The arc-spray method is not efficient for more complex recessed part geometries.

SUMMARY

A disclosed method of hard coating a wear surface of a valve of an aircraft air management system is performed by depositing a hardface alloy powder onto the wear surface, heating the wear surface and the hardface alloy powder to transform the hardface alloy powder into a molten liquid mass, and subsequently cooling the molten liquid hardface alloy mass to solidify the hardface alloy onto the wear surface.

The disclosed method provides for localized application and subsequent bonding of the hardface alloy to discrete portions of a thrust plate or other part. The solidified hardface alloy coating may then be machined to obtain specific wear surface geometries.

These and other features disclosed herein can be best understood from the following specification and drawings, the following of which is a brief description.

BRIEF DESCRIPTION OF THE DRAWINGS

FIG. 2 is a sectional view of an interface between an example valve shaft and an example thrust plate.

FIG. 3 is an enlarged view of the example thrust plate and thrust surface.

FIG. 5 is an enlarged cross-section of the example hardface alloy powder deposited on the example thrust surface.

FIG. 6 is a schematic view of a thrust surface geometry and solidified hardface alloy.

FIG. 7 is a schematic view of another thrust surface geometry and solidified hardface alloy.

DETAILED DESCRIPTION

Figure 1:
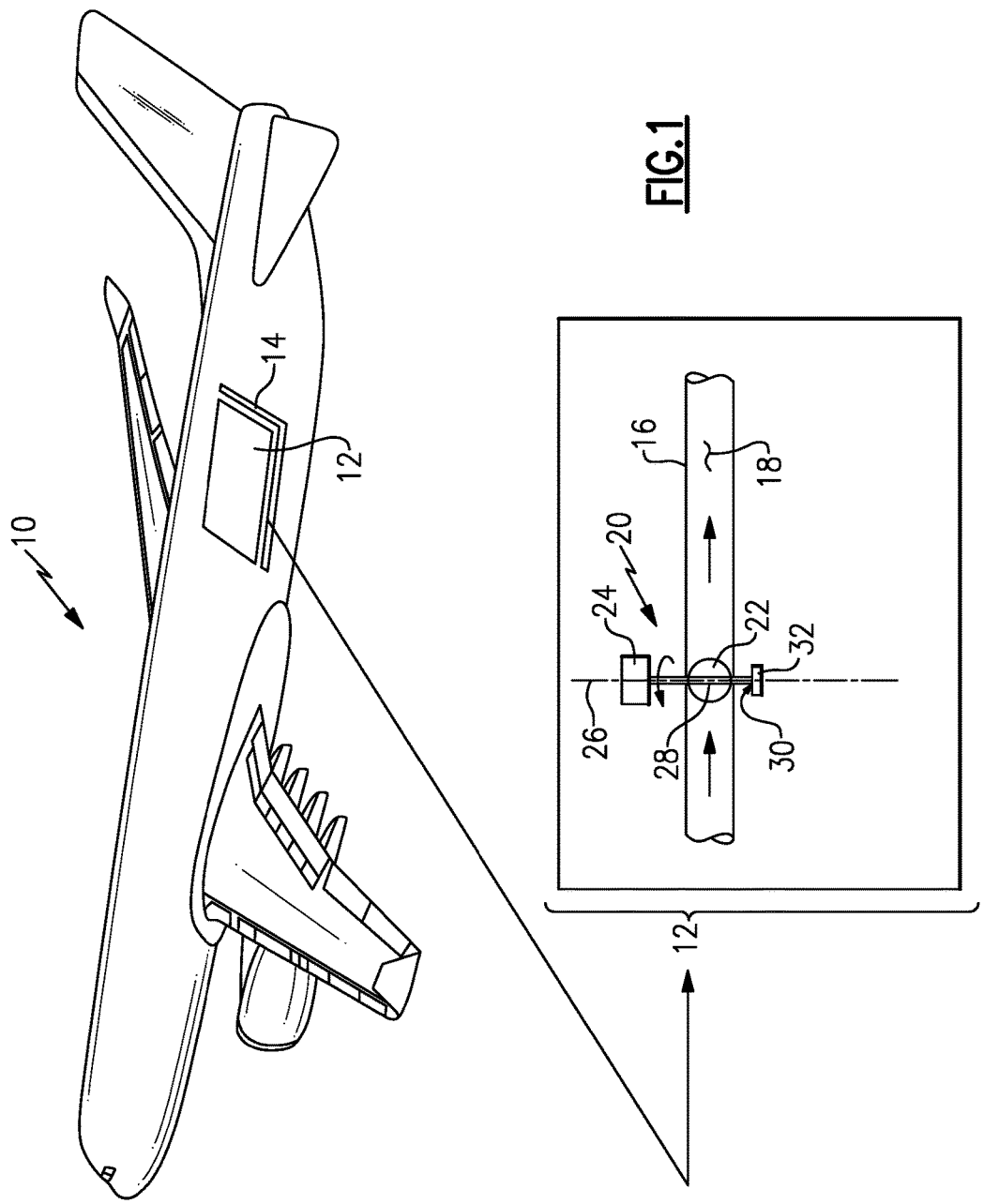
FIG. 1 is a schematic view of an aircraft including an air management system.

Referring to FIG. 1, an aircraft 10 includes an air management system 12 mounted to a support 14 within the aircraft 10. The example air management system 12 includes a conduit 16 that defines a passage 18 for air flow. A valve assembly 20 controls airflow through the passage 18 and includes a valve plate 22 mounted on a shaft 28 and rotated by an actuator 24 about an axis 26. The shaft 28 includes an axial end 30 that is supported by a thrust plate 32. The example thrust plate 32 limits movement of the shaft along the axis 26. The example air management system 12 is required to operate within an extreme temperature range, at high vibration levels with little or no lubrication. Accordingly, the example thrust plate 32 includes a hardface surface between abutting relative moving parts such as the interface between the axial end 30 and the thrust plate 32.

Referring to FIGS. 2 and 3, the example thrust plate 32 includes a hardface coating 38 disposed on a thrust surface 34. The example thrust surface 34 is surrounded by walls 36 that correspond with a profile of the shaft 28. The axial end 30 of the shaft 28 abuts and rotates on the hardface coating 38 to provide the desired wear protection.

The example hardface coating 38 is formed from a hard and wear resistant material such as a Colmonoy 6 alloy (Ni—Cr—B—Si—Fe) with an HRC range between 55 and 60. Moreover other alloy compounds and materials that provide the desired wear performance at the extreme temperatures could also be utilized and are within the contemplation of this disclosure. The example thrust plate 32 is formed from a metal material compatible with the environment in which the valve assembly 20 operates. The example metal material forming the thrust plate 32 is of hardness less than that of the hardface coating 38.

The shaft 28 is engaged in abutting contact with the thrust surface 34 and therefore the entire thrust plate 32 does not encounter the wear experienced and is not required to be fabricated from a material capable of the wear resistance provided by the hardface coating 38. The hardface coating 38 is therefore formed locally on the wear prone surfaces of the thrust plate 32. In this example, the thrust surface 34 absorbs the majority of contact and therefore is provided with the hardface coating 38. Other applications where wear resistance is desired could utilize a hardface alloy coating on other portions of the part and are within the contemplation of this disclosure.

The example thrust plate 32 includes the side walls 36 surrounding the recessed thrust surface 34. Access to the thrust surface 34 is therefore complicated due to the confined area in which the hardface coating 38 is required.

Figure 4:
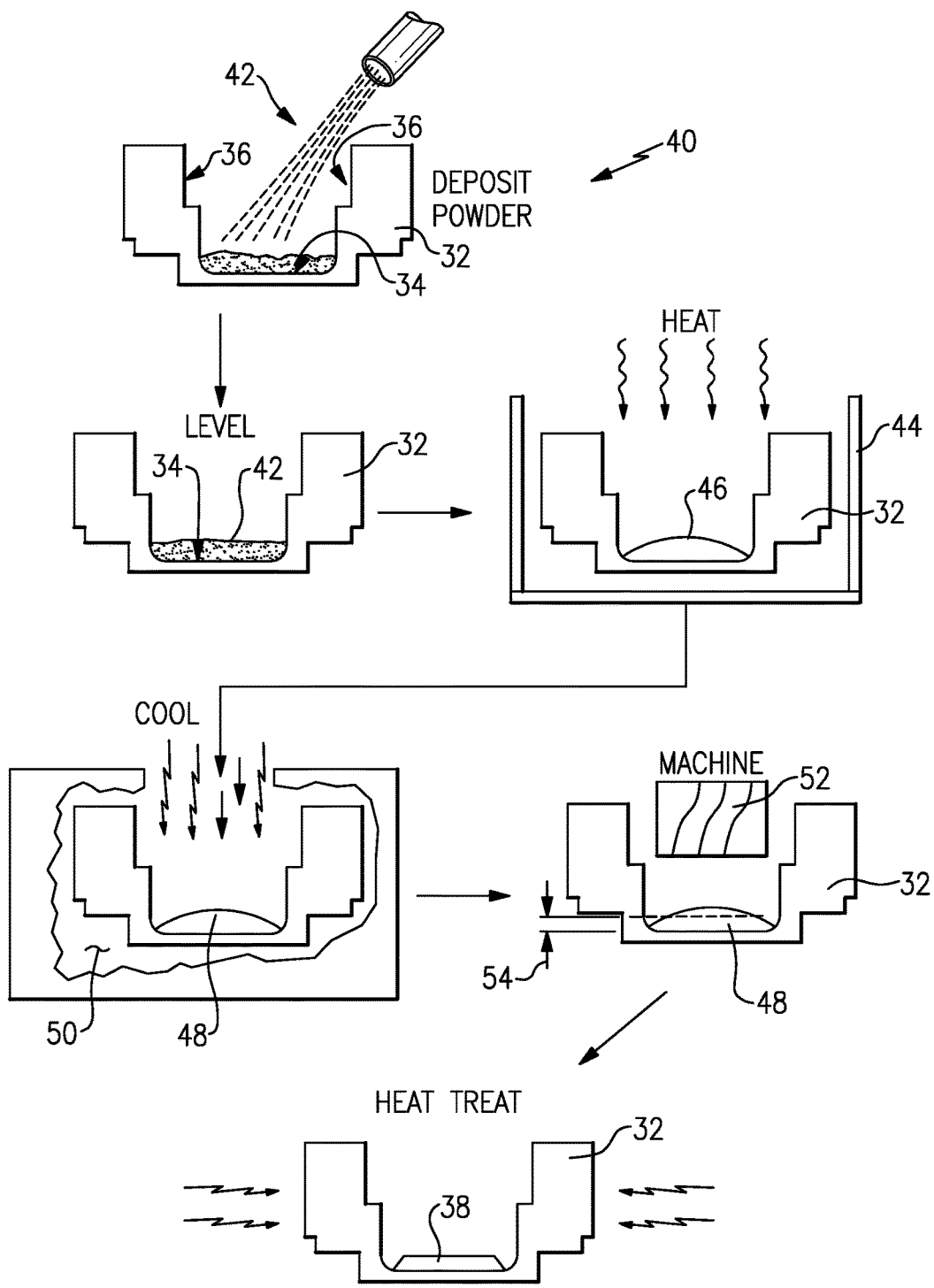
FIG. 4 is schematic view of a disclosed process for forming a hardface on a thrust surface.

Referring to FIG. 4, an example process for locally applying the hardface coating 38 is schematically shown at 40 and includes an initial step of depositing a hardface alloy powder 42 onto the wear surface. In this example, the hardface alloy powder 42 is deposited on the thrust surface 34 that is recessed between the walls 36. The hardface alloy powder 42 settles on the thrust surface 34 and is distributed substantially evenly across the thrust surface 34. The hardface alloy powder 42 is then leveled out as shown in FIG. 5 and prepared for heating.

The thrust plate 32 with the hardface alloy powder 42 is placed on a level even surface within a vacuum furnace 44. The temperature within the vacuum furnace 44 is then raised to a first temperature that is below the melting point of the hardface alloy powder 42. Once a suitable vacuum pressure is attained, the vacuum furnace may be backfilled with a low partial pressure of an inert gas. This may be necessary for certain hardfacing alloys containing elements which are prone to out-gassing. The first temperature is maintained for a desired first dwell time such that the hardface alloy powder 42 may attain thermal equilibrium. As should be understood, the specific temperature and dwell time is dependent on the specific hardface alloy powder material along with the material comprising the thrust plate 32.

Once the hardface alloy powder 42 has attained the desired thermal equilibrium, the temperature is raised to a second temperature above the liquidus temperature of the hardface alloy powder 42, but below a melting temperature of the thrust plate 32. Therefore, the hardface alloy powder 42 is heated to a molten liquid state indicated at 46 while the thrust plate 32 remains in the solid state. Accordingly, the hardface alloy powder 42 is formed from a material having a melting temperature lower than that of the material utilized to form the thrust plate 32.

Referring to FIG. 6 with continued reference to FIG. 4, transformation of the hardface alloy powder 42 into the molten liquid hardface alloy 46 may generate surface tension. It is this surface tension that results in a slight contraction or balling up of the molten liquid hardface alloy 46 as is schematically shown. The edges of the molten liquid hardface alloy 46 draw inwardly away from the side walls 36 to form the doomed shape schematically shown. In this example, edges of the molten liquid hardface alloy 46 draw away from the side walls 36 and form an angle 56 relative to the wear thrust surface 34. In this example, the angle is approximately 110°. It should be understood that other angles may result from different material and process parameters.

The second temperature is held for a second dwell time to provide substantially complete transformation of the hardface alloy powder 42 into molten liquid hardface alloy 46. Upon completion of the desired second dwell period at the second temperature, the thrust plate 32 is cooled to room temperature by inert gas quenching directly from the second temperature or controlled furnace cooling to a third cooling temperature below the solidus of the hardface alloy, then gas quenching. The second temperature may also include a temperature range below the liquidus temperature but above the solidus temperature where incipient melting is present such that most of the hardface alloy powder 42 is changed to the liquid state. Accordingly, it is within the contemplation of the disclosed process to utilize temperatures to change the hardface alloy powder 42 into a molten material, but is not required to be at the full liquidus temperature.

The cooling step is performed as a quench or slow cool from the second melting temperature to the third cooling temperature to solidify or freeze the molten liquid hardface alloy 46 in the shape attained in the melting step. The frozen or solidified material substantially retains the shape attained at the second temperature. In the disclosed example, a doom shape is attained, however other shapes can be attained by leveling or otherwise orientating the hardface alloy powder 42. The resulting frozen or solid hardface alloy 48 forms a predictable and repeatable shape that covers the desired portions of the thrust surface 34. The example thrust plate 32 is maintained at the third cooling temperature until a thermal equilibrium at room temperature is attained. The cooling process produces a dense coating of the solid hardface alloy 48 with less than 1% porosity and uniform microstructure.

Once the thrust plate 32 and solid hardface alloy 48 is completely cooled, a machining step is performed to attain a desired thickness 54 of the completed hardface coating 38. A machine tool 52 is utilized to extend into the recess of the thrust plate 32 and machine the solid hardface alloy 48 to the desired thickness 54. The machine process utilized to attain the desired thickness may include any known material removal process compatible with the hardface alloy material and desired production parameters. The resulting hardface alloy coating 38 provides the desired wear resistant surface of the thrust plate 32. A subsequent heat treat may be implemented to restore thrust plate 32 mechanical properties, since the braze process may anneal or solutionized the chosen base metal.

Referring to FIG. 7, another example thrust plate 60 includes a recess 62 disposed below thrust surface 70 that receives a portion of the hardface alloy 64. A portion of the hardface alloy 64 accumulates within the recess 62 and results in a corresponding depression 66 on a top surface of the hardface alloy 64. The edges shown in this disclosed example of the solidified hardfaced alloy 64 forms the angle 68 during the melting process. The disclosed example angle and shape of the solidified hardfaced alloy 64 can be modified to provide other shapes as desired. The depression 66 is subsequently machined away to provide the desired smooth level wear surface. In this example, the hardface alloy 64 is machined away to the thrust surface 70. In other words, the resulting thrust surface 70 is flat and includes a desired thickness of the hardface alloy 64 that is disposed within the recess 62. This configuration provides a desired thickness of the hardface alloy 64 that is substantially flush with the thrust surface 70.

The hardface alloy powder can be deposited on discreet surfaces and locations to provide a desired wear surface in hard to reach locations. Moreover, different configurations can be utilized within the contemplation of this disclosure to provide the desired hardface wear surface.

Accordingly, the disclosed method of hard coating a wear surface of a valve of an aircraft air management system is provides localized application and subsequent bonding of the hardface alloy to discrete portions of a thrust plate or other part. The solidified hardface alloy coating may then be machined to obtain specific wear surface geometries.

Although an example embodiment has been disclosed, a worker of ordinary skill in this art would recognize that certain modifications would come within the scope of this disclosure. For that reason, the following claims should be studied to determine the scope and content of this invention.

What is claimed is:

1. An air management system for an aircraft comprising:
   a valve plate movable for controlling airflow through a passage;
   a valve shaft including an axial end supporting the valve plate within the passage; and
   a thrust plate for controlling axial movement of the valve shaft, the thrust plate including a thrust surface including a hardface alloy coating in contact with the axial end of the valve shaft, the thrust surface is surrounded by walls and the hardface alloy coating is formed from a hardface alloy powder melted and solidified on the thrust surface, wherein the hardface alloy coating is spaced apart from the walls surrounding the thrust surface and is machined to a predefined thickness on the thrust surface.

2. The air management system as recited in claim 1, wherein the thrust surface is recessed.

3. The air management system as recited in claim 2, wherein the hardface alloy powder is disposed only on the thrust surface and not the walls.

4. The air management system as recited in claim 2, wherein the valve shaft includes a first diameter received within the thrust plate that is less than a second diameter outside of the thrust plate.

5. The air management system as recited in claim 1, wherein the hardface alloy is deposited onto the thrust surface as a powder and transformed into a mostly molten liquid mass on the thrust surface by elevating the thrust plate and the hardface alloy powder to a temperature sufficient to melt the hardface alloy powder and not melt the thrust plate.

6. The air management system as recited in claim 1, including an actuator for controlling movement of the valve plate to control airflow through the passage.

7. An airflow control valve comprising:
a valve plate movable for controlling airflow through a passage;
a valve shaft including an axial end supporting the valve plate within the passage; and
a thrust plate for controlling axial movement of the valve shaft, the thrust plate including a thrust surface with a hardface alloy coating in contact with the axial end of the valve shaft, wherein the thrust surface is surrounded by walls and the hardface alloy coating is spaced apart from the walls and formed from a hardface alloy powder melted and solidified on the thrust surface and is machined to a predefined thickness on the thrust surface.

8. The airflow control valve as recited in claim 7, wherein the thrust surface is recessed.

9. The airflow control valve as recited in claim 7, wherein the valve shaft includes a first diameter received within the thrust plate that is less than a second diameter outside of the thrust plate.

10. The airflow control valve as recited in claim 7, wherein the hardface alloy is deposited onto the thrust surface as a powder and transformed into a mostly molten liquid mass on the thrust surface by elevating the thrust plate and the hardface alloy powder to a temperature sufficient to melt the hardface alloy powder and not melt the thrust plate.

11. The airflow control valve as recited in claim 7, including an actuator for controlling movement of the valve plate to control airflow through the passage.

* * * * *